United States Patent [19]

Tasaka et al.

[11] Patent Number: 4,734,114
[45] Date of Patent: Mar. 29, 1988

[54] CONTROLLING METHOD OF AIR SEPARATOR

[75] Inventors: Yasuo Tasaka; Tadashi Satono, both of Kudamatsu, Japan

[73] Assignee: Hitachi, Ltd., Tokyo, Japan

[21] Appl. No.: 931,999

[22] Filed: Nov. 18, 1986

[30] Foreign Application Priority Data

Nov. 22, 1985 [JP] Japan .................................. 60-261040

[51] Int. Cl.⁴ ................................................ F25J 3/04
[52] U.S. Cl. .......................................... 62/37; 62/21; 62/32; 364/501
[58] Field of Search .................... 62/11, 32, 36, 37, 42, 62/21; 364/500, 501, 502

[56] References Cited

U.S. PATENT DOCUMENTS 3,361,646  1/1968  MacMullan et al. ............... 62/37 X
3,855,074 12/1974  Mosler et al. .................... 364/501 X
3,911,259 10/1975  Huddleston et al. ............... 364/501
3,912,476 10/1975  Mikawa et al. ......................... 62/37
4,544,452 10/1985  Halliday et al. .................... 62/37 X
4,624,746 11/1986  Hiramatsu ....................... 364/501 X

FOREIGN PATENT DOCUMENTS 559627  1/1975  Japan .
960504  9/1982  U.S.S.R. ................................. 62/11

Primary Examiner—Steven E. Warner
Attorney, Agent, or Firm—Antonelli, Terry & Wands

[57] ABSTRACT

This invention makes an optimal control of an air separator for any set value of a product quantity by inputting a necessary product quantity, calculating a minimum necessary raw air quantity by use of the capacity of the air separator and its operating condition and using this quantity as a set value for a raw air quantity adjustment loop.

4 Claims, 3 Drawing Figures

CONTROLLING METHOD OF AIR SEPARATOR

BACKGROUND OF THE INVENTION

This invention relates to a controlling method of an air separation plant.

One conventional controlling method of an air separator is disclosed in Japanese Patent Publication No. 9627/1980. The gist of this prior art technique resides in that a raw air quantity is calculated using the condition of each portion of the plant as the input and outputs the calculated value as a set value for a raw air quantity adjusting device.

However, the set value of the raw air quantity adjusting device by this method is outputted primarily in accordance with the plant condition, and a problem develops in that even when an increase command of the raw air quantity is generated, the raw air quantity cannot be increased due to mechanical limitation, and the like.

SUMMARY OF THE INVENTION

The controlling method of the present invention makes an optimal control of an air separator by calculating a product quantity that can be collected by use of a predetermined maximum raw air quantity that can be supplied and an operating condition of a bubble tower, then comparing an input value of a necessary product quantity with the collectable product quantity, setting the necessary product quantity as a product formation quantity when the necessary product quantity is smaller than, or equal to, the collectable product quantity, setting the collectable product quantity as the product formation quantity when the necessary product quantity is greater than the collectable product quantity, outputting the set value of the product formation quantity as a set value for the product formation quantity adjusting device, calculating the necessary raw air quantity by use of the set value of the product formation quantity and the operating condition of a bubble tower and outputting it as a set value of the raw air quantity adjusting device.

DESCRIPTION OF THE PREFERRED EMBODIMENT

Hereinafter, one embodiment of the present invention will be described in detail with a reference to a nitrogen generation apparatus as one of the kinds of air separation apparatuses by way of example.

Figure 1:
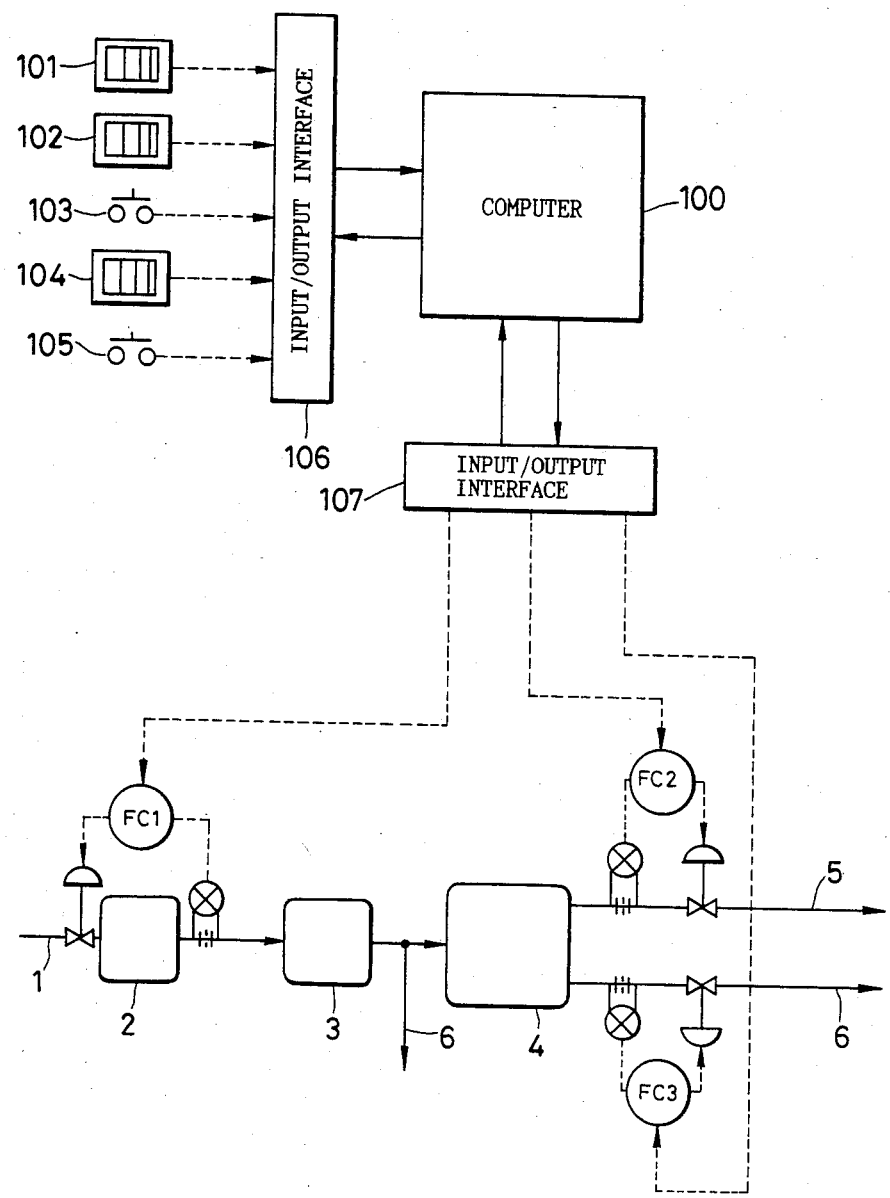
FIG. 1 is a block diagram showing an air separation process and a controlling apparatus in accordance with one embodiment of the present invention.

FIG. 1 is a block diagram showing the combination of an air separation process and a controlling apparatus. The process will be described with reference to this drawing. First of all, raw air introduced from a pipe 1 is compressed by a raw air compressor 2 to a predetermined pressure of about 7 Kg/cm$^2$G necessary for deep cooling, liquefaction, rectification and separation. Impurities such as moisture, carbonic acid gas, and the like, are adsorbed and removed by a preprocessing unit 3.

After the impurities are thus removed, part of the clean air is withdrawn as the air for instrumentation and sealing from a pipe 6, while the rest is introduced into means 4 for deep cooling, liquefaction, rectification and separation, where it is cooled, liquefied, rectified and separated. The resulting product gas nitrogen is obtained from a pipe 5 and the product liquefied nitrogen, from the pipe 6.

Next, the principal portion of the means for deep cooling, liquefaction, rectification and separation in the construction described above will be described in further detail with reference to FIG. 2.

While part of the air is in the liquid state, the raw air is blown into a bubble tower 201 from a pipe 21 and a gas becomes an ascending gas inside the bubble tower 201. While keeping a gas-liquid contact with a later-appearing reflux liquid, the ascending gas becomes a nitrogen gas having a high purity at the top of the tower. Part of the nitrogen gas having a high purity is withdrawn as the product gas from a pipe 22, and the rest is liquefied by a nitrogen condensor 202 and turns into the reflux liquid described above. Part of this reflux liqquid is withdrawn as the product liquid nitrogen from a pipe 23.

The remaining reflux liquid descends inside the bubble tower while keeping the gas-liquid contact with the ascending gas described above, and turns into liquid air at the bottom of the tower.

The liquid air passes through a pipe 24 and is adiabatically expanded expanded a valve 25 and its temperature drops. The liquid air is then supplied to the nitrogen condensor 202 as a cooling medium for liquefying nitrogen described above. The liquid air thus supplied to the nitrogen condensor 202 liquefies the nitrogen gas, evaporates by itself and changes to an exhaust gas and is thereafter discharged from a pipe 26.

Material balance in the construction described above will now be examined. The following relational formula can be established with symbols representing the following factors.

$$QA = QLA + QGN + QLN \qquad (1)$$

where:
QA: air quantity supplied from pipe 21
QGN: nitrogen gas quantity withdrawn from pipe 22
QLN: liquid nitrogen quantity withdrawn from pipe 23
QLA: liquid air quantity leaving tower bottom.

Since the oxygen concentration in the raw air (atmosphere) is 21% and the oxygen concentration in the product nitrogen is 0%, the material balance of oxygen will be considered. All the oxygen components in the raw air are contained in the liquid air from the lower portion of the bubble tower and delivered, and the following relational formula can be considered:

$$X \times QLA = 0.21 \times QA \qquad (2)$$

where X: oxygen concentration in liquid air
Accordingly, $$QLA = (0.21/X) \times QA \qquad (3)$$

If the formula (3) is put into the formula (1), $$QA = \frac{0.21}{X} \times QA + QGN + QLN \qquad (4)$$

-continued $$\therefore QA = \frac{X(QGN + QLN)}{X - 0.21} \quad (5)$$

$$\therefore QGN + QLN = \frac{(X - 0.21)QA}{X} \quad (6)$$

The formula (5) means that the necessary raw air quantity can be determined if the necessary product nitrogen quantity and the oxygen concentration in the liquid air are set, and the formula (6) represents that the product nitrogen quantity that can be collected can be determined if the raw air quantity that can be supplied and the oxygen concentration in the liquid air are set.

Incidentally, the oxygen concentration X in the liquid air is determined from the relation of solubility of acetylene in the liquid air and the gas-liquid equilibrium lest trace acetylene or the like in the air is concentrated, built up and precipiated in the liquid air inside the nitrogen condensor 202, for the safety reasons, but the detailed description in this conjunction will be omitted.

Though the description given above explains only the material balance, the ratio (hereinafter called "L/V") of the descending liquid (reflux liquid) to the ascending gas inside the bubble tower must be kept constant in order to establish the safety operation condition inside the bubble tower.

Figure 2:
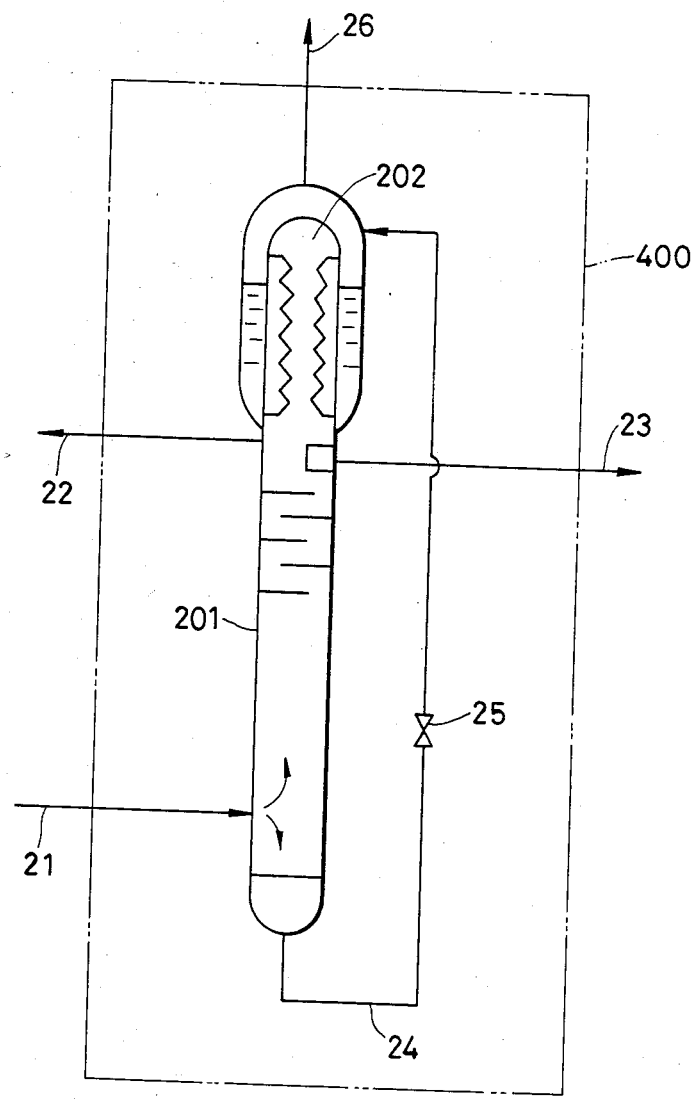
FIG. 2 is a systematic diagram of a bubble tower portion.

Next, the thermal balance of the bubble portion of FIG. 2 will be considered as a whole. When nitrogen gas alone is collected as the product, the liquid nitrogen is zero, and it is the exhaust gas from the pipe 26 and nitrogen gas from the pipe 22 that leave outward the bubble portion, and they are gaseous. If the raw air entering the bubble portion is gaseous, too, their calories can be believed to be substantially balanced. When liquid nitrogen is withdrawn as part of the product, however, the chilling quantity for liquefaction corresponding to the quantity of liquid nitrogen becomes necessary from the aspect of thermal balance because nitrogen is withdrawn as the liquid. The material that enters the bubble portion from outside is only the raw air of the pipe 21. Therefore, the raw air must enter as the liquid in the quantity corresponding to the quantity of liquid nitrogen to be withdrawn, and this quantity can be regarded as substantially equal to the quantity of the product liquid nitrogen.

Accordingly, the ascending gas quantity V inside the bubble tower is the balance obtained by subtracting the liquid air quantity QLA from the raw air quantity QA:

$$V = QA - QLN \quad (7)$$

On the other hand, the descending liquid quantity L inside the bubble tower is the balance obtained by subtracting the product nitrogen gas quantity and the product liquid nitrogen quantity QLN from the ascending gas and can be expressed as follows:

$$L = V - QGN - QLN \quad (8)$$

When the formula (8) is put into the formula (7), $$L = QA - QLN - QGN - QLN \quad (9)$$

Therefore, $$L = QA - QGN - 2QLN \quad (10)$$

When L/V is obtained from the formulas (7) and (10), $$L/V = \frac{QA - QGN - 2QLN}{QA - QLN} ; \quad (11)$$

Therefore, $$QA = \frac{QGN + QLN}{(1 - L/V)} + QLN \quad (12)$$

or $$QA = \frac{QGN + (2 - L/V)QLN}{1 - L/V} \quad (13)$$

The formula (12) means that a greater quantity of the raw air corresponding to the liquid product quantity is necessary than when all the products are gas.

In the formula (13), the quantity $\Delta QGN$ that reduces the gas product when the liquid product is increased by $\Delta QLN$ at the same air quantity can be determined from the following relational formula obtained by use of the numerator as a constant:

$$QGN + (2 - L/V)QLN = QGN - \Delta QGN + (2 - L/V)(-QLN + \Delta QLN) \quad (14)$$

$$\therefore \Delta QGN = (2 - L/V)\Delta QLN \quad (15)$$

This formula represents that if the quantity of the liquid product is increased or decreased at the same raw air quantity, the gas product must be operated at the ratio of $(2 - L/V)$ times in order to establish the same condition.

In the formula (12) or (13), the necessary raw air quantity when the liquid product is zero is given as follows:

$$QA = \frac{QGN}{1 - L/V} \quad (16)$$

On the other hand, the necessary raw air quantity when the liquid product is zero can be obtained as follows from the formula (5):

$$QA = \frac{X \cdot QGN}{X - 0.21} \quad (17)$$

Since the left sides of the formulas (16) and (17) are equal, the following relational formula can be obtained:

$$\frac{QGN}{1 - L/V} = \frac{X \cdot QGN}{X - 0.21} \quad (18)$$

$$L/V = \frac{0.21}{X} \quad (19)$$

When the formula (19) is put into the formula (12) or (13), $$QA = \frac{QGN + QLN}{1 - \frac{0.21}{X}} + QLN \quad (20)$$

$$QA = \frac{QGN + \left(2 - \frac{0.21}{X}\right)QLN}{1 - \frac{0.21}{X}} \quad (21)$$

In order words, if the formulas (20) and (21) are used, the operation for concurrently collecting the liquid product can be made under the same rectification operation as the operation for collecting only the gas product by setting the oxygen concentration X in the liquid air at the time of collection of the gas product.

Since the description given above determines the necessary raw air quantity with the bubble tower being the primary member, the raw air quantity QA for the apparatus as a whole can be obtained by adding miscellaneous gas quantity QBG such as the air for instrumentation and for sealing to the formulas (20) and (21). Namely, the necessary air quantity QA can be obtained as follows:

$$QA = \frac{QGN + QLN}{1 - \frac{0.21}{X}} + QLN + QBG \quad (22)$$

or $$QA = \frac{QGN + \left(2 - \frac{0.21}{X}\right) QLN}{1 - \frac{0.21}{X}} + QBG \quad (23)$$

Next, the construction and control content of the controlling apparatus will be described with reference to FIGS. 1 and 2.

In FIG. 1, a computer 100 receives read commands such as a necessary gas product nitrogen quantity by a daisy switch 101 through an input interface 106, a necessary liquid product nitrogen quantity by a daisy switch 102, a necessary gas product nitrogen quantity and a liquid product nitrogen quantity by a push button switch 103, other parameters such as control constants by a digital switch 104, and parameter read commands by a push button switch 105. On the other hand, the computer 100 outputs flow rate set values to a minor loop FC1 for controlling the raw air flow rate, a minor loop FC2 for controlling the gas product nitrogen flow rate and a minor loop FC3 for controlling the liquid product nitrogen flow rate, respectively, through an input/output interface 107.

In the construction described above, when the computer 100 detects that the push button switch 103 for the read command of the necessary product quantity is pushed, it reads the necessary product formation quantity from the daisy switches 101 and 102, calculates the optimal raw air flow rate, gas product nitrogen quantity and liquid product nitrogen quantity on the basis of this necessary product formation quantity, and outputs them as the set values for the respective minor adjustment loops FC1, FC2 and FC3.

Each minor adjustment loop makes control on the basis of the set value from the computer so that the practical flow rate in the loop is in agreement with the set value.

Calculation by the computer 100 in this control can obtain the optimal set values in accordance with the formula (22) or (23) as described already. However, the raw air flow rate QA in the formula can be secured by the raw air compressor 2 in FIG. 1. Since there exists mechanically an upper limit value $QA_{max}$ of the raw air quantity, this control cannot be made if the raw air quantity QA of the calculation result exceeds this upper limit value $QA_{max}$, however the computer might calculate.

Figure 3:
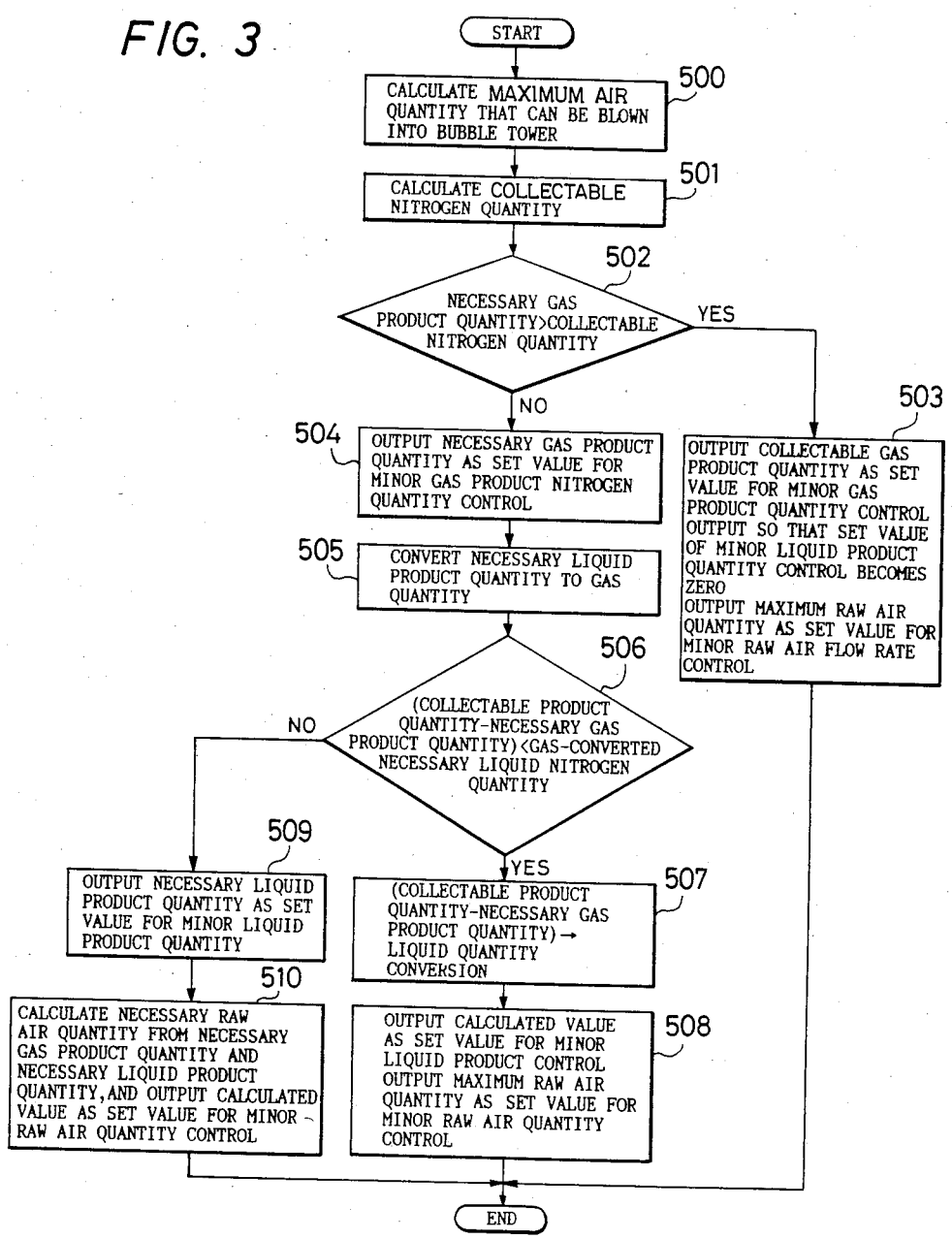
FIG. 3 is a flowchart showing a controlling method.

The embodiment of the present invention changes the set value of the product formation quantity when such a state occurs, so that the raw air quantity as the result of calculation does not exceed the upper limit value. This method will be explained with reference to the flowchart of FIG. 3.

First of all, a predetermined miscellaneous gas quantity QBG is subtracted from a predetermined maximum raw air quantity $QA_{max}$ to obtain a maximum air quantity Qa that can be blown into the bubble tower, in block 500. Next, a gas product nitrogen quantity $QGN_{max}$ that can be collected is determined in accordance with the formula (17) by use of the air quantity QA and an oxygen impurity X in the predetermined liquid air, in block 501.

Next, in block 502, the collectable gas product nitrogen quantity $QGN_{max}$ described above and a necessary gas product nitrogen quantity set from outside are compared. When the necessary gas product nitrogen quantity is greater than the collectable gas product nitrogen quantity, the flow proceeds to block 503, where the collectable gas product nitrogen quantity is outputted as the set value for the minor gas product nitrogen control loop FC2. Needless to say, since the liquid product cannot be collected any more, the set value zero is outputted to the minor liquid nitrogen quantity control loop FC3. The maximum raw air quantity $QA_{max}$ is outputted as the set value to the minor raw air flow rate control loop FC1, and this flow is completed.

On the other hand, in block 502, if the necessary gas product quantity set from outside is smaller than the collectable gas product quantity $QGN_{max}$ in block 502, the flow proceeds to block 504, where the necessary gas product nitrogen quantity is outputted as the set value to the minor gas product nitrogen control loop FC2. In block 505, the necessary liquid product nitrogen quantity from outside is converted to the gas quantity using the formula (15). As is obvious from the formula (19), the ratio L/V in this formula (15) can be of course expressed as a function of the oxygen concentration X in the liquid air.

Next, whether or not the balance obtained by substracting the necessary gas product quantity from the collectable product is greater than the gas-converted necessary liquid nitrogen flow rate is compared in block 506. If the gas-converted necessary liquid nitrogen flow rate is found greater, the flow proceeds to block 507, where the balance obtained by subtracting the necessary gas product quantity from the collectable product quantity is again converted to the liquid quantity in accordance with the formula (15), and the converted liquid quantity is outputted as the set value to the minor liquid product nitrogen quantity control loop FC3. The maximum raw air quantity $QA_{max}$ is outputted as the set value to the minor raw air flow rate control loop FC1, and this flow is completed.

Next, in block 506, if judgement proves to be opposite to the above, the flow proceeds to block 509, where the necessary liquid product quantity is outputted as the set value to the minor liquid nitrogen control loop FC3.

In block 510, the necessary raw air quantity is calculated by use of the necessary gas product quantity, the necessary liquid product quantity and the predetermined oxygen concentration X in the liquid air in accordance with the formula (22) or (23) and the result of calculation is outputted as the set value to the minor raw air quantity control loop FC1. This flow is thus completed.

It will be obvious from the explanation of the process given above that the ratio of the descending liquid to the ascending gas, i.e., L/V, can be used in the same way in place of the oxygen concentration X in the liquid air for the calculation.

As described above, the present invention can make optimal control for any set value of the necessary product quantity.

What is claimed is:

1. A method of controlling an air separator comprising:
    calculating a product quantity that can be collected by use of a predetermined maximum raw air quantity that can be supplied and by use of an operating condition of a bubble tower;
    comparing an input value of a necessary product quantity with said product quantity that can be collected;
    setting said necessary product quantity as a product formation quantity when said necessary product quantity is smaller than, or equal to, said product quantity that can be collected;
    outputting said product formation quantity as a set value for a product formation quantity adjusting device;
    calculating a necessary raw air quantity by use of said set value for said product formation quantity adjusting device and said operating condition of said bubble tower;
    outputting said necessary raw air quantity as a set value for a raw air quantity adjusting device;
    setting said product quantity that can be collected as said product formation quantity when said necessary product quantity is greater than said product quantity that can be collected;
    outputting said product formation quantity as a set value for a product formation quantity adjusting device; and
    outputting said maximum raw air quantity as a set value for a raw air quantity adjusting device.

2. The controlling method of an air separator as defined in claim 1, wherein said operating condition of said bubble tower used to calculate said product quantity that can be collected is the impurity of liquid air at a lower portion of said bubble tower.

3. The controlling method of an air separator as defined in claim 1, wherein said operating condition of said bubble tower used to calculate said product quantity that can be collected is a reflux radio of descending liquid to ascending gas, L/V, inside said bubble tower.

4. A method of controlling an air separator comprising:
    calculating a gas product quantity that can be collected by using the equation;

$$QA = \frac{x \cdot QGN}{x - 0.21}$$

wherein,
    $QA$ = predetermined maximum raw air quantity that can be supplied,
    $x$ = oxygen content in liquid air at a lower portion of a bubble tower,
    $QGN$ = gas product quantity that can be collected;
    comparing an input value of a necessary gas product quantity with said gas product quantity that can be collected;
    setting said necessary gas product quantity as a gas product formation quantity when said necessary gas product quantity is smaller than or equal to said gas product quantity that can be collected;
    outputting said gas product formation quantity as a set value for a gas product formation quantity adjusting device;
    calculating a liquid product quantity that can be collected using the equation;

$$\Delta QGN = (2 - L/V)\Delta QLN$$

wherein,
    $\Delta QGN$ = difference between gas product quantity that can be collected and gas product formation quantity,
    $L/V = 0.21/x$, where x is the oxygen content in liquid air of said lower portion of said bubble tower,
    $\Delta QLN$ = difference between a liquid product quantity that can be collected and a necessary liquid product quantity;
    setting said necessary liquid product quantity as a liquid product formation quantity when said necessary liquid product quantity is smaller than or equal to said liquid product quantity that can be collected;
    outputting said liquid product formation quantity as a set value for a liquid product formation quantity adjusting device;
    calculating a necessary raw air quantity by using at least one of the equations;

$$QA = \frac{QGN + QLN}{1 - 0.21/x} + QLN$$

$$QA = \frac{QGN + \left(2 - \frac{0.21}{x}\right) QLN/1}{1 - 0.21/x}$$

wherein,
    $QA$ = necessary raw air quantity
    $QGN$ = gas product formation quantity
    $QLN$ = liquid product formation quantity
    $x$ = oxygen content in liquid air of said lower portion of said bubble tower;
    outputting said necessary raw air quantity as a set value for a raw air quantity adjusting device;
    setting said liquid product quantity that can be collected as a liquid product formation quantity when said necessary liquid product quantity is greater than said liquid product quantity that can be collected;
    outputting said liquid product formation quantity as a set value for said liquid product formation quantity adjusting device;
    outputting said maximum raw air quantity as a set value for said raw air quantity adjusting device;
    setting said gas product quantity that can be collected as a gas product formation quantity when said necessary gas product quantity is greater than said gas product quantity that can be collected;
    outputting said gas product formation quantity as a set value for said gas product formation quantity adjusting device;
    outputting zero as a set value for said liquid product formation quantity adjusting device; and
    outputting said maximum raw air quantity as a set value for said raw air quantity adjusting device.

* * * * *